Sept. 13, 1966  F. P. SHARPE  3,272,501
ADJUSTABLE STROKE INTERMITTENT SHEET
FEEDER HAVING PLURAL SHUTTLE MEANS
Filed Feb. 17, 1964  6 Sheets-Sheet 6

Fig. 11.

INVENTOR.
Frederick P. Sharpe.
BY
Harness, Dickey & Pierce
ATTORNEYS

United States Patent Office 3,272,501
Patented Sept. 13, 1966

3,272,501
ADJUSTABLE STROKE INTERMITTENT SHEET FEEDER HAVING PLURAL SHUTTLE MEANS
Frederick P. Sharpe, Dearborn, Mich., assignor to Kelsey-Hayes Company, Romulus, Mich., a corporation of Delaware
Filed Feb. 17, 1964, Ser. No. 345,470
10 Claims. (Cl. 271—55)

This invention relates generally to a work handling device, and more particularly, to a work feeding apparatus which is adapted to selectively deliver successive sheets of sheet metal work stock to a metal shearing press.

The work feeding apparatus of the present invention is characterized by a novel arrangement of a plurality of sheet metal engaging tangs which are adapted to selectively reciprocate along a longitudinal path to feed sheet metal work stock at a preselected rate into a shearing press. A particular feature of the present invention resides in the fact that the longitudinal position of the initial work stock engaging tangs is adjustable such that work stock may be initially fed into the shearing press and be cut to any desired incremental working length. Moreover, the work stock engaging tangs are oriented in the work feeding device, and their movement is so synchronized, that successive sheets of work stock may be continuously fed into the shearing press without any delay or interruption in the cyclic operation thereof.

It is an object of the present invention to provide a work feeding device of the above character which is entirely automatic in operation.

It is another object of the present invention to provide a work feeding device of the above character wherein the work stock is aligned both longitudinally and transversely with respect to the shearing press prior to being transmitted thereto.

It is still another object of the present invention to provide a work feeding device of the above character wherein the length of the initial work feeding stroke of the device may be varied by a simple manual adjustment.

It is yet another object of the present invention to provide a work feeding device which may be easily assembled and which is both smooth and dependable in operation.

Other objects and advantages of the present invention will become apparent from the following detailed description taken in conjunction with the accompanying drawings, wherein:

FIGURE 3 is a side elevational view of a continuation of the structure illustrated at the left of FIGURE 1;

FIGURE 5 is a side elevational view of a continuation of the structure illustrated at the left of FIGURE 3;

FIGURE 6 is a top elevational view of the structure illustrated in FIGURE 5;

FIGURE 7 is a side elevational view of a continuation of the structure illustrated at the left of FIGURE 5;

FIGURE 8 is a top elevational view of the structure illustrated in FIGURE 7;

FIGURE 9 is a transverse cross-sectional view taken along the line 9—9 of FIGURE 1.

Figures 1, 2:
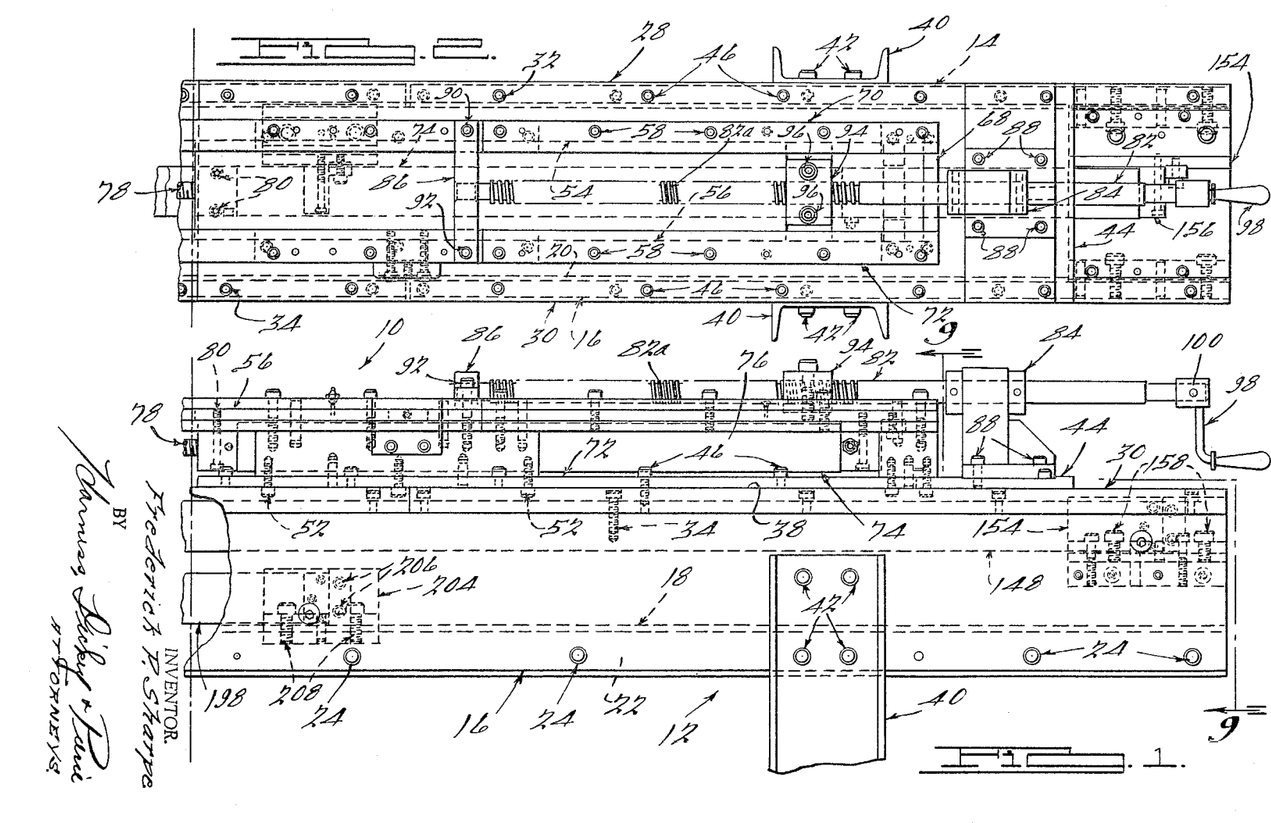
FIGURE 1 is a side elevational view of one end of the work feeding apparatus of the present invention.
FIGURE 2 is a top elevational view of the structure illustrated in FIGURE 1.
Figure 2:
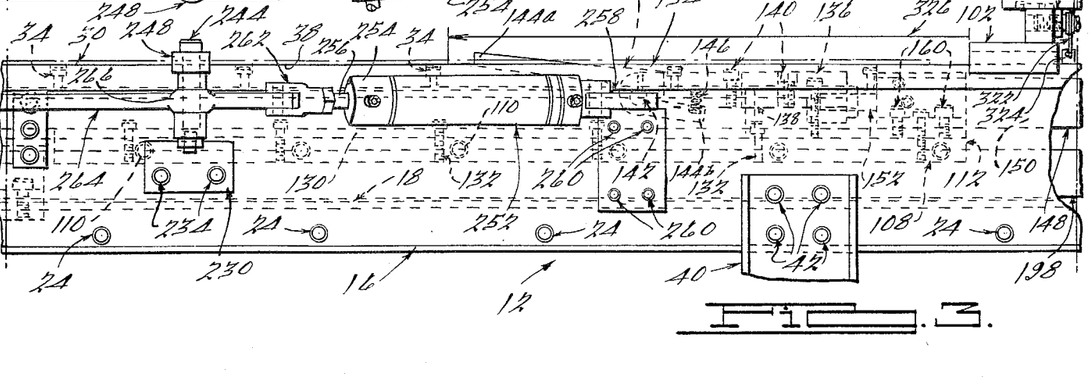

Referring now to FIGURES 1 and 9 of the drawings, a work feeding apparatus 10, in accordance with an exemplary embodiment of the present invention, includes an elongated support structure 12 which consists of a pair of spaced parallel, vertically extending side plates 14 and 16, and a horizontally extending reinforcing plate 18 having downwardly extending flange sections 20 and 22 which are respectively secured to the inboard sides of the side plates 14 and 16 by a plurality of bolts and locking nuts, generally designated 24 and 26, respectively. Coextending along the top of the side plates 14 and 16 are a pair of work stock supporting slide rails 28 and 30. The rails 28 and 30 are respectively secured to the top of the plates 14 and 16 by a plurality of bolts 32 and 34, and respectively define upper surfaces 36 and 38 upon which sheet metal work stock may freely slide. A plurality of longitudinally spaced support legs, generally designated 40, extend vertically downward from the outboard sides of the plates 14 and 16, and are rigidly secured thereto by a plurality of bolts 42. At the outer end of the support structure 12, an elongated plate 44 extends horizontally across the rails 28 and 30 and is secured to the upper surfaces 36 and 38 thereof by a plurality of bolts 46, (see FIGURE 1).

As best seen in FIGURE 9, a pair of spaced parallel slideway support rails 48 and 50 extend longitudinally of and are secured by bolts 52 to the top of the plate 44. A pair of spaced confronting slideways 54 and 56, which are coextensive with the rails 48 and 50, are respectively secured to the upper surfaces thereof by a plurality of bolts 58. The slideways 54 and 56 respectively include generally L-cross-sectioned lower guide sections 60 and 62 which respectively provide horizontal bearing or sliding surfaces 64 and 66. A flat elongated carriage plate 68 extends laterally between the slideways 54 and 56, and is longitudinally slidable upon the bearing surfaces 64 and 66 provided by the lower guide sections 60 and 62 thereof. A pair of longitudinally extending retaining rails 70 and 72 are respectively secured to the upper surfaces of the guide sections 60 and 62, and extend laterally inwardly therefrom to a position overlying the lateral outboard edges of the carriage plate 68. It will thus be seen that the retaining rails 70 and 72 allow the carriage plate 68 to move longitudinally within the slideways 54 and 56 while effectively precluding any relative vertical movement therebetween.

As illustrated in FIGURE 1, a conventional hydraulic power assembly, generally designated by the numeral 74 and which includes an external cylinder or housing 76 and a reciprocal piston 78, extends longitudinally of the carriage plate 68 and is rigidly secured to the lower side thereof by a plurality of bolts 80. It may be noted that the power assembly 74 is longitudinally movable with the carriage plate 68 as the latter member slides within the slideways 54 and 56. A longitudinally extending shaft 82, having a helically threaded medial portion 82a, is rotatably mounted in a position at least partially overlying the outer (right) end of the carriage plate 68 by a pair of longitudinally spaced shaft support housings 84 and 86. The support housing 84 is secured to the outer end of the horizontally extending plate 44 by a plurality of bolts, generally designated 88, while the support housing 86 extends across or bridges the retaining rails 70 and 72 and is secured to the upper surfaces thereof by bolts 90 and 92. Threaded on the medial portion 82a of the shaft 82 is an annular sleeve or coupling 94 which is secured by bolts 96 to the top of the carriage plate 68. A manipulating handle 98 is secured to the outer end of the shaft 82 by a set screw 100 and is adapted to be rotated to effect a longitudinal movement of the coupling 94 on the shaft 82.

With this structure thus described, it will be seen that upon appropriate rotation of the handle 98, the coupling 94 will move longitudinal of the shaft 82, thereby effecting a corresponding longitudinal movement of the carriage plate 68 and the hydraulic power assembly 74. Accordingly, it will be seen that the stroke of a transversely extending, work stock engaging dog 102 (see FIGURES 3 and 4), which is threadably mounted by a nut 104 on the outer (left) end of the power assembly's piston 78, and which extends across the rails 28 and 30 and is slidable upon the upper surfaces 36 and 38 thereof, may be adjusted with respect to the support structure 12 by proper rotation of the handle 98.

Figure 4:
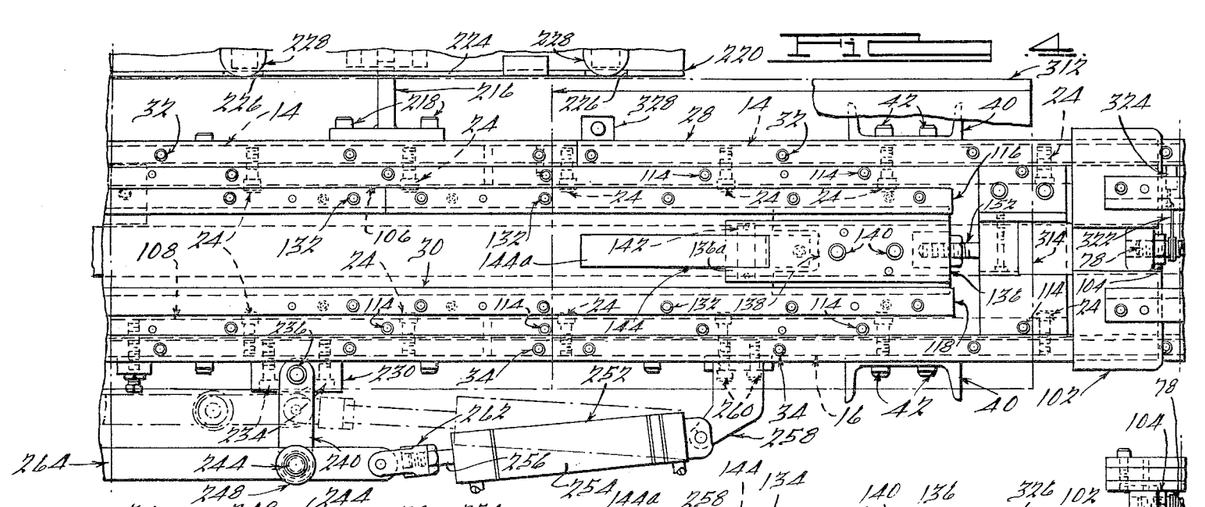
FIGURE 4 is a top elevational view of the structure illustrated in FIGURE 3.
Figure 10:
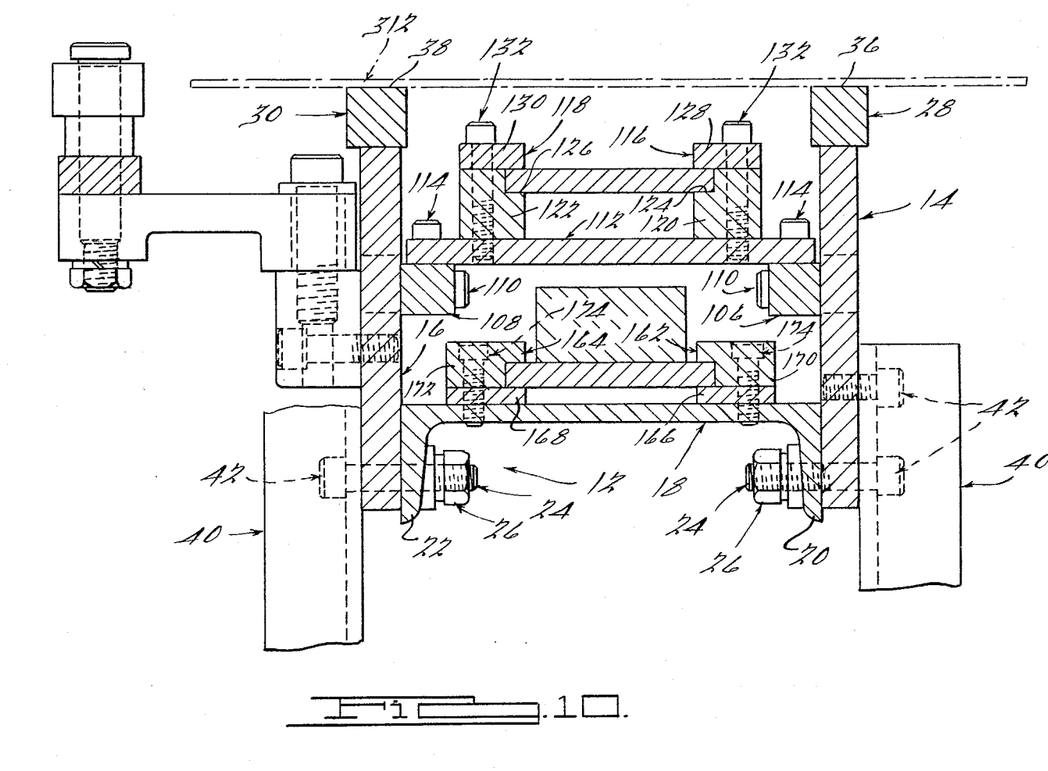
FIGURE 10 is a transverse cross-sectional view taken along the line 10—10 of FIGURE 5.
Figure 11:
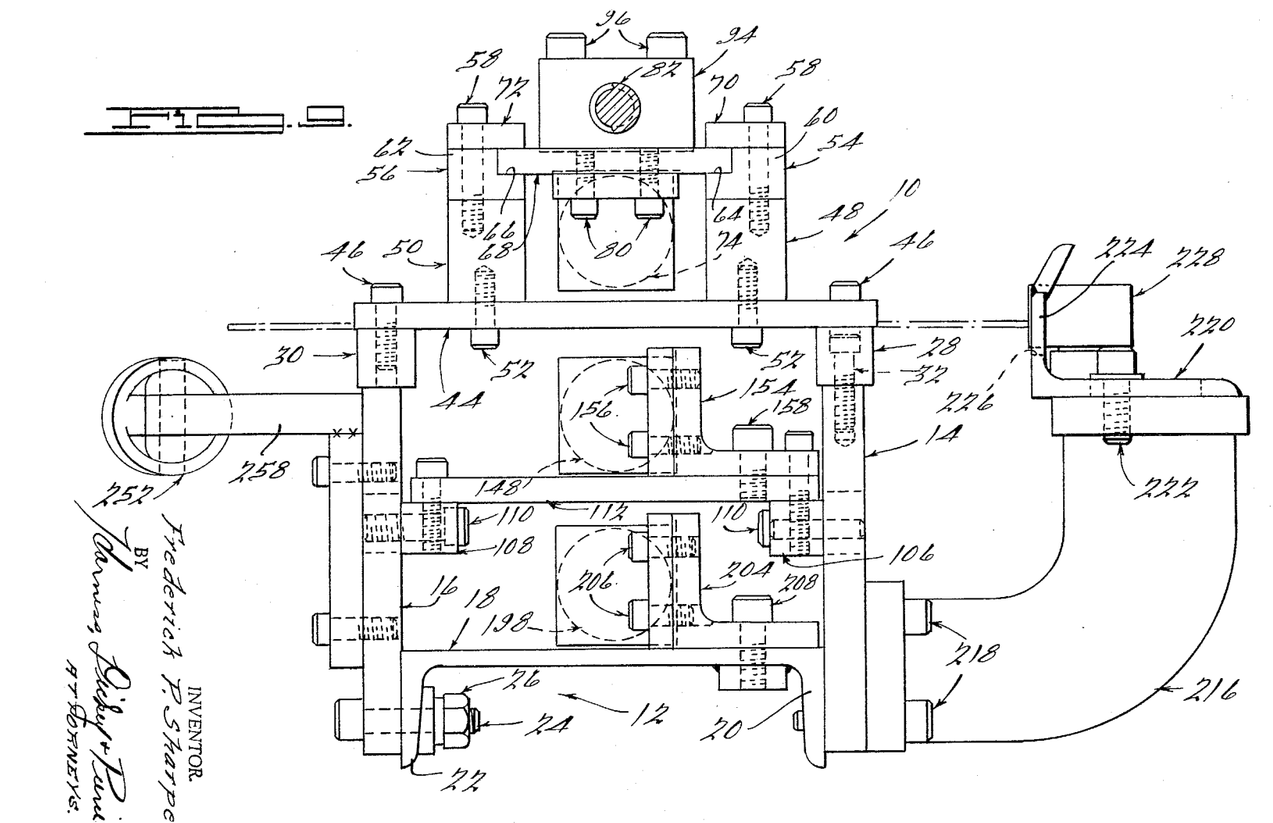

Referring now to FIGURES 3, 4 and 10, spaced longitudinally inward from the structure thus described (to the left) is a pair of parallel, coextensive and longitudinally opposed support rails 106 and 108 which are respectively secured to the lateral inboard sides of the side plates 14 and 16 by a plurality of bolts, generally designated 110. A longitudinally extending horizontal plate 112 extends between and is secured to the rails 106 and 108 by a plurality of bolts 114. As seen in FIGURE 10, a pair of spaced parallel slideways 116 and 118, which respectively include L-cross-sectioned base portions 120 and 122 that define upper bearing surfaces 124 and 126. The slideways 116 and 118 further include retaining rails 128 and 130 which are respectively mounted on the top of the base portions 120 and 122, and are secured, together with the base portions 120 and 122, to the plate 112 by bolts 132. A shuttle assembly, generally designated 134, which includes an elongated shuttle member 136 having a bifurcated yoke portion 136a, is secured to the upper side of a generally H-shaped shuttle plate 138 that extends between the slideways 116 and 118 by a plurality of bolts 140. The lateral outboard sides of the shuttle plate 138 are slidably supported upon the bearing surfaces 124 and 126 of the slideway base portions 120 and 122, thereby enabling the entire shuttle assembly 134 to slide longitudinally within the slideways 116 and 118. Pivotably mounted within the yoke portion 136a of the shuttle member 136 by a pivot pin 142 is a work stock engaging dog or tang 144. The tang 144 is formed with a work stock engaging outer (left) end portion 144a which normally extends above the horizontal plane defined by the surfaces 36 and 38 of the rails 28 and 30, but which may be pivoted downward about the axis of the pin 142 to a position underlying said plane. A helical coil spring 146 extends between the shuttle member 136 and a downwardly and rearwardly projecting portion 144b of the tang 144 to resiliently but yieldably maintain the work stock engaging end portion 144a projecting above the level of the horizontal plane of the surfaces 36 and 38.

A hydraulic power assembly 148, which is of a construction similar to that of the aforediscussed assembly 74 and which includes an exterior housing 150 and reciprocal piston 152, extends longitudinally between the side plates 14 and 16 at the outer (right) end of the support structure 12, as seen in FIGURES 1 through 4. The power assembly 148 is connected at its outer end to a support bracket 154 by bolts 156 (see FIGURES 1 and 9), which bracket is in turn supported on the horizontally extending plate 112 by bolts 158. As seen in FIGURE 3, the inner (left) end of the power assembly 148 is rigidly secured to the plate 112 by bolts 160. The power assembly's piston 152 is threadably connected to the outer (right) end of the shuttle member 136, and upon actuation of the assembly 148, the piston 152 is adapted to move longitudinally outward from the housing 150, thereby effecting longitudinal movement of the entire shuttle assembly 134 within the slideways 116 and 118.

Referring now to the structure illustrated in FIGURES 5, 6 and 10, which structure is a continuation of the structure to the left of that which has hereinbefore been described, a pair of longitudinally extending, spaced parallel slideways 162 and 164, respectively consisting of lower bearing plates 166 and 168 and upper L-sectioned retaining sections 170 and 172, are secured to the top of the plate 18 by a plurality of bolts, generally designated 174. Longitudinally movable within the slideways 162 and 164 is a shuttle assembly 176 which is similar in construction and operation to the shuttle assembly 134. The shuttle assembly 176 includes an elongated shuttle member 178 having a yoke section 178a and is secured to the lower side of a shuttle plate 180 by a plurality of bolts 182. The outboard sides of the shuttle plate 180 bear upon the upper surfaces of the plates 166 and 168 of the slideways 162 and 164 and the entire shuttle assembly 176 is adapted to slide longitudinally therewithin. A pair of laterally spaced work stock engaging tangs 184 and 186 are supported on the outer ends of a cylindrical pivot shaft 188 which extends laterally through suitable apertures in the shuttle member's yoke section 178a. The tangs 184 and 186 have work stock engaging end sections 190 and 192, respectively, which normally extend above the horizontal plane defined by the work stock supporting surfaces 36 and 38, but which are pivotable about the axis of the shaft 188 to a position below said plane. Extending downwardly and rearwardly from the shaft 188, at a position interjacent the sides of the shuttle member's yoke section 178a, is a pivot link 194. A helical coil spring 196 extends between the link 194 and the lower side of the shuttle plate 180 to resiliently but yieldably maintain the shaft 188 and tangs 184 and 186 oriented such that the sections 190 and 192 are disposed in their normal upwardly projecting position.

A hydraulic power assembly 198, which comprises a cylindrical housing 200 within which reciprocates a hydraulic pressure responsive piston 202, extends longitudinally within the support structure 12 interjacent the side plates 14 and 16, and the horizontally extending plates 18 and 112. As seen in FIGURES 1 and 9, the outer end of the assembly 198 is connected to a support bracket 204 by bolts 206, which bracket is in turn supported on the plate 18 by bolts 208. The opposite (left) end of the power assembly 198 is secured to a bracket 210 by bolts 212, and the bracket 210 is attached to the plate 18 by bolts 214, as illustrated in FIGURE 6. The outer end of the piston 202 is threaded into the outer (right) side of the shuttle member 178 such that actuation of the assembly 198 will effect longitudinal movement of the shuttle assembly 176 and accordingly bias the tangs 184 and 186 longitudinally of the support structure 12.

A plurality of longitudinally spaced and generally L-shaped arms, generally designated 216, are secured to the lateral outboard side of the side plate 14 by a plurality of bolts 218. The arms 216 extend outwardly and upwardly from the side of the plate 14 to a position slightly below the horizontal plane defined by the surfaces 36 and 38. A longitudinally extending roller support rail 220 is mounted upon the arms 216, and is rigidly secured thereto by bolts 222. The rail 220 includes a vertically upwardly extending face section 224 within which a plurality of longitudinally spaced rectangular openings 226 are formed. Mounted on the rail 220 adjacent each of the openings 226 is one of a plurality of guide rollers, generally designated 228. The rollers 228 are mounted on the rail 220 such that at least a small peripheral section thereof extends through the adjacent guide rail opening 226, and such that each of these roller sections is in substantial longitudinal alignment with respect to the structure 12. Accordingly, work stock which is supported upon the surfaces 36 and 38 may be biased against the rollers 228 and thereby be longitudinally aligned with respect to the longitudinal axis of the apparatus 10.

As seen in FIGURES 3 through 6, a pair of longitudinally spaced roller support brackets 230 and 232 are secured to the laterally outboard side of the plate 16 by a plurality of bolts 234. Pivotably connected to the brackets 230 and 232 by pins 236 and 238 are a pair of roller support links 240 and 242, respectively. Extending vertically upward from the outer ends of the links 240 and 242 are a pair of roller spindles or shafts 244 and 246, respectively, which rotatably support cylindrical rollers 248 and 250, respectively. As seen in FIGURES 3 and 4, a hydraulic power assembly 252, which comprises a hydraulic cylinder or housing 254 and piston 256, is pivotably supported on the outboard side of the plate 16 by a bracket 258 that is secured to the plate 16 by bolts 260. A bifurcated fitting 262 is threaded on the outer end of the piston 256 and is pivotably connected to one (right) end of a longitudinally extending shaft 264, which shaft is in turn pivotably connected to the roller support spindles 244 and 246 through sleeve sections 266 and 268 which are integrally formed on the opposite ends of the shaft 264. Upon actuation of the power assembly 252, the piston 256 will move longitudinally outward from the housing 254, thereby pivoting the links 240 and 242, together with the rollers 248 and 250, about their respective support pins 236 and 238 from the position illustrated by the solid lines in FIGURES 4 and 6 to the position indicated by the phantom lines of this structure illustrated in FIGURES 4 and 6. As the rollers 248 and 250 are thus pivoted, they are adapted to engage the work stock which is supported on the surfaces 36 and 38 and bias it into engagement with the plurality of guide rollers 228 which are mounted on the opposite side of the structure 12, thereby properly aligning or orienting the work stock with respect to the apparatus 10 prior to the work stock being fed into the shearing press.

As illustrated in FIGURE 7, a friction brake assembly, generally designated 270, is supported above the left end of the structure 12 by a downwardly extending member 272. The brake assembly 270 consists of a work stock engaging arm 274 which is pivotably mounted at its medial section to the member 272 by a pin 276 which extends between a pair of shoulder sections 278 and 280 formed on the member 272. An adjustment bolt 282 extends from the upper end of the arm 274 through a suitable aperture in the member 272 and is secured at one (right) side of a cylindrical spacer element 284 by a suitable nut 286. A helical coil spring 288 extends coaxially of the bolt 282 and is adapted to resiliently urge the upper end of the arm 274 away from the member 272, thereby engaging the lower end of the arm 274 with the upper surface of the work stock supported upon the surfaces 36 and 38 of the structure 12. The brake assembly 270 operates to overcome the forward momentum of work stock on the structure 12 during the initial positioning of the work stock prior to it being cut to length. It will be apparent that upon suitable rotatiton of the bolt 282, the resilient force exerted by the spring 288, and thus the force exerted on the work stock by the arm 274, may be varied considerably.

As best seen in FIGURES 7 and 8, the outer (left) end of the work feeding apparatus 10 abuts directly against the side of a sheet shearing press, one side of which is illustrated herein and designated by the numeral 290. A work stock stop assembly, generally designated 292, is supported on a horizontally extending plate 294 of a base portion of the shearing press, herein designated 296. The stop assembly 292 includes a base 298 and an adjustment member 300 which are secured to the plate 294 by bolts 302 and 304. A plurality of longitudinally spaced adjustment bores, generally designated 306, are formed in the plate 294 within which the bolts 302 and 304 may be selectively mounted to effect the relative longitudinal position of the stop assembly 292 with respect to the support structure 12. The stop assembly 292 also includes a work stock engaging face section 308, against which the leading or forward edge of the work stock being fed into the press is abutted prior to the operation of the press. A limit switch 310 is mounted on the face section 308 and is adapted to be successively actuated by the work stock being fed into the press to effect the cyclical operation of the press. More specifically, subsequent to each shearing operation of the press, the forward or leading edge of the remaining work stock in the apparatus 10 is biased into engagement with the switch 310 thereby effecting the next successive cycle of the press.

To facilitate correlating the hereinbefore described structure of the work feeding apparatus 10, the operation thereof will now be given in conjunction with the various controls which are used to effect actuation of the hydraulic power assemblies 74, 148, 198 and 252.

Immediately prior to the operation of the work feeding apparatus 10, work stock in the form of a single elongated sheet of metal sheet, herein designated by the numeral 312, is transmitted by a suitable de-piling or work stock carriage means to a position overlying the apparatus 10 and wherein the longitudinal axes of the sheet 312 and that of the apparatus 10 are substantially parallel. The sheet 312 is then dropped onto the upper surfaces 36 and 38 of the rails 28 and 30. The rear drop line of the sheet 312 is indicated by the numeral 314 in FIGURE 4, and the front drop line is indicated by the numeral 316 in FIGURE 8. When the plate 312 is dropped onto the rails 28 and 30, it engages and actuates a limit switch 318 mounted on the inboard side of the side plate 16, as illustrated in FIGURES 5 and 6. Actuation of the limit switch 318 is, through a suitable electro-hydraulic control circuit (not shown), adapted to effect the energization of the hydraulic power assembly 252, thereby pivoting the rollers 248 and 250 into engagement with the edge of the plate 312 and biasing it into engagement and alignment with the plurality of guide rollers 228. As the shaft 264 extending between the roller support links 240 and 242 is biased laterally inwardly upon actuation of the power assembly 252, it engages and actuates a second limit switch 320 mounted on the lateral outboard side of the side plate 16, as seen in FIGURES 5 and 6. Actuation of the limit switch 320 operates through the aforementioned control circuit to energize the hydraulic power assembly 74, whereby the piston 78 moves longitudinally outward (to the left) from the power assembly's housing 76. Longitudinal movement of the piston 78 effects a corresponding longitudinal movement of the work stock engaging dog 102. As the dog 102 moves to the left, it engages the rear edge of the sheet 312 and slides the entire sheet 312 to the left upon the rails 28 and 30.

As previously mentioned, prior to operation of the apparatus 10, the longitudinal position of the entire power assembly 74 may be adjusted by suitable rotation of the handle 98 such that upon actuatiton of the power assembly 74, the forward movement of the dog 102 will bias the sheet 312 a preselected distance into the shearing press for the initial cutting operation.

As best seen in FIGURES 3 and 4, an actuating cam 322 is provided on the forward end of the piston 78 and is adapted to engage and actuate a limit switch 324 mounted on the inboard side of the side plate 14 upon forward movement of the piston 78. Actuation of the limit switch 324 effects the initial energization of the shearing press whereby a predetermined amount of the leading or forward end of the sheet 312 is sheared therefrom. It may be noted that when the sheet 312 is supported on the upper surfaces 36 and 38 of the rails 28 and 30, the work stock engaging end portions 144a, 190 and 192 of the tangs 144, 184 and 186, respectively, are pivoted below the horizontal plane defined by the surfaces 36 and 38.

After the initial shearing operation of the press, the piston 78 will continue to move longitudinally outward (to the left), thereby continually sliding the sheet 312 longitudinally along the rails 28 and 30 and into the press. The length of the stroke of the piston 78 is indicated by the arrow 326 in FIGURE 3. As the rear or trailing edge of the sheet 312 is biased past the tang 144 through actuation of the piston 78 and longitudinal movement of the dog 102, the work stock engaging end portion 144a of the tang 144 is pivoted upwardly to the position illustrated in FIGURE 3.

A photoelectric cell 328, which is mounted on the lateral outboard side of the side plate 14 (see FIGURE 4) is actuated as the rear edge of the sheet 312 passes thereover. Actuation of the cell 328 effects energization of the power assembly 148, thereby effecting longitudinal movement of the power assembly's piston 152 and a corresponding longitudinal movement (to the left) of the entire shuttle assembly 134. As the shuttle assembly 134 moves foward within the slideways 116 and 118, the work stock engaging section 144a of the tang 144 engages the rear edge of the sheet 312 and slides it longitudinally on the rails 28 and 30 towards the shearing press. Each time the leading edge of the sheet 312 engages the switch 310 on the stop assembly 292, the press is actuated, whereby the forward end of the sheet 213 is sheared off. The piston 152 is adapted to advance the sheet 312 longitudinally along the rails 28 and 30 to a position where the rear edge of the sheet 312 is located slightly to the left of the tangs 184 and 186 of the shuttle assembly 178 (note the forward position of the tang 144 indicated by the phantom lines in FIGURE 5). As the trailing edge of the sheet 312 passes over the tangs 184 and 186, the work stock engaging sections 190 and 192 thereof are pivoted upwardly about the axis of the pivot shaft 188 to the position illustrated in FIGURE 5. There is provided another photoelectric cell 330 mounted on the lateral outboard side of the side plate 14 (see FIGURE 6) which is actuated as the rear edge of the sheet 312 is moved thereover upon being biased longitudinally to the left by the tang 144. Actuation of the photoelectric cell 330 is synchronized with the forward movement of the sheet 312 such that the cell 330 effects energization of the hydraulic power assembly 198 just as the rear edge of the sheet 312 passes over the tangs 184 and 186. Energization of the power assembly 198 causes the piston 202 to move longitudinally outward (to the left) of the cylinder 200, thereby engaging the tangs 184 and 186 with the rear edge of the sheet 312 and further sliding the sheet 312 along the surfaces 36 and 38 into the shearing press.

Another limit switch 332, which is mounted on the inboard side of the side plate 16 (see FIGURES 5 and 6) and which remains in an open position until such time as the rear edge of the sheet 312 passes thereover, is adapted to effect suitable controls in the work stock de-piling device when the rear edge of the sheet 312 passes thereover, thereby positioning the next successive sheet of work stock which is to be fed into the shearing press over the apparatus 10. Still another limit switch 334 is mounted in the friction brake assembly 270 and is adapted to be actuated as the rear edge of the sheet 312 passes beneath the arm 274, thereby effecting the de-piling device to drop the next successive sheet of work stock onto the rails 28 and 30 and initiate the next successive cycle of the work feeding apparatus 10, as herein described.

While it will be apparent that the exemplary embodiment of the invention herein disclosed is well calculated to fulfill the objects above stated, it will be appreciated that the invention is susceptible to modification, variation and change without departing from the proper scope or fair meaning of the subjoined claims.

What is claimed is:
1. In a work feeding apparatus,
a support structure having an elongated work stock supporting surface,
shuttle means slidably mounted within said support structure,
means on said shuttle means engageable with work stock supported on said surface and being movable to and from a position at least partially projecting above said supporting surface,
means on said structure for effecting the longitudinal movement of said shuttle means,
means including roller means mounted on said support structure for movement toward and away from said shuttle means for aligning said work stock longitudinally on said structure, and means for moving said roller means.

2. In a work feeding apparatus,
a support structure having an elongated work stock supporting surface,
a plurality of shuttles slidably mounted on said support structure, first and second slideway means for supporting said shuttles for longitudinal sliding movement, said first slideway means overlapping said second slideway means, whereby said shuttles on said second slideway means do not engage the work stock until the shuttles on said first slideway means register with said second slideway means,
means on each of said shuttles engageable with work stock supported on said surface,
means for effecting longitudinal movements of each of said shuttles, and
means on said support structure for laterally aligning work stock on said structure.

3. A work feeding apparatus as set forth in claim 2 wherein said means on said shuttles on said second slideway means are movable to a position projecting above said supporting surface when said shuttles on said first slideway means move into registry with said second slideway means.

4. In a material handling device,
a support structure having an elongated work stock supporting surface,
a first shuttle slidably mounted on said structure,
a second shuttle slidably mounted on said structure longitudinally spaced from said first shuttle,
power means on said structure for effecting longitudinal movement of each of said shuttles on said structure,
tang means pivotably mounted on each of said shuttles,
said tang means having a work stock engaging portion which is movable to and from a position projecting above said surface, alignment means mounted on said support structure along one side of said surface,
roller means pivotably mounted on said alignment means movable therewith to and from a position engaging work stock supported on said surface, and
power means on said structure for effecting movement of said alignment means.

5. In a device for handling elongated sheet material,
a supporting structure including a pair of spaced parallel base rails which provide a work stock supporting surface,
a first pair of laterally spaced and longitudinally extending slideways mounted on said support structure,
a second pair of laterally spaced and longitudinally extending slideways mounted on said support structure,
said second pair of slideways being at least partially coextensive with said first pair of slideways,
a third pair of laterally spaced and longitudinally extending slideways adjustably mounted on said support structure and being selectively movable to and from varying positions coextending with said second pair of slideways,
a pair of shuttles slidably mounted one in each of said first and second pairs of slideways,
a longitudinally extending tang pivotably mounted on each of said shuttles,
each of said tangs having a work stock engaging section which is movable to and from a position projecting above said work stock supporting surface,
spring means on each of said shuttles normally maintaining said work engaging section of each of said tangs projecting above said surface,
fluid pressure means on said support structure operable to effect the sliding movement of each of said shuttles in said slideways, a first plurality of longitudinally aligned rollers rigidly mounted on one side of said support structure, a second plurality of rollers pivotably mounted on the opposite side of said support structure and being movable to and from a position engaging work stock on said surface with said first plurality of rollers, and fluid pressure means on said structure for effecting said pivotal movement of said second plurality of rollers.

6. In combination with a sheet metal shearing device, a work feeding apparatus which includes, a support structure having an elongated work stock supporting surface, means for laterally aligning sheet metal work stock on said surface including a plurality of rollers and means on said structure for moving said rollers laterally of said structure to and from engagement with the work stock, shuttle means longitudinally slidable in said support structure and successively engageable with said work stock to continually bias said work stock into said shearing device, and means for effecting the longitudinal movement of said shuttle means.

7. The combination as set forth in claim 6 wherein said shuttle means comprises a plurality of longitudinally spaced shuttles, each of which is slidable along separate longitudinal paths.

8. The combination as set forth in claim 6 wherein said shuttle means includes a plurality of adjacent longitudinally slidable shuttles, each of which is adapted to effect longitudinal movement of said work stock when one of the adjacent of said shuttles biases said work stock a preselected distance along said surface.

9. In combination with a sheet metal shearing device, a work feeding apparatus which includes, a support structure having an elongated work stock supporting surface, a plurality of longitudinally extending and at least partially overlapping slideways mounted on said support structure, shuttle means longitudinally slidable within each of said slideways and adapted to successively engage work stock supported on said surface to bias said work stock into said shearing device, and means for laterally aligning work stock on said structure including roller means mounted for lateral pivotal movement toward and away from the longitudinal axis of said slideways.

10. The combination as set forth in claim 9 wherein each of said shuttle means is reciprocable along a preselected longitudinal path and wherein the path of at least one of said shuttle means may be longitudinally adjusted.

References Cited by the Examiner
UNITED STATES PATENTS

| | | | |
|---|---|---|---|
| 1,029,159 | 6/1912 | Westerbeck | 271—55 X |
| 1,066,528 | 7/1913 | Randolph | 271—55 |
| 1,780,049 | 10/1930 | Troyer | 271—54 |
| 2,672,835 | 3/1954 | Paul | 271—54 X |
| 3,022,068 | 2/1962 | Weidman | 271—55 |
| 3,116,658 | 1/1964 | Baker | 83—278 |

M. HENSON WOOD, Jr., *Primary Examiner.*

A. N. KNOWLES, *Assistant Examiner.*